United States Patent [19]

Hicks et al.

[11] Patent Number: 4,548,863

[45] Date of Patent: Oct. 22, 1985

[54] FRANGIBLE SEAL COATING AND ITS METHOD OF PRODUCTION

[76] Inventors: Irwin A. Hicks, 714 Woodcrest Rd., Radnor, Pa. 19087; Donald C. Ruddy, 2545 Martin Rd., Willow Grove, Pa. 19090

[21] Appl. No.: 676,096

[22] Filed: Nov. 29, 1984

[51] Int. Cl.$^4$ .................. C08K 3/40; B32B 27/38; B32B 27/14

[52] U.S. Cl. .................. 428/325; 427/204; 427/327; 427/386

[58] Field of Search .................. 427/204; 428/325

[56] References Cited

U.S. PATENT DOCUMENTS

| | | |
|---|---|---|
| 3,547,455 | 12/1970 | Daunt . |
| 3,575,427 | 4/1971 | Lapac et al. .................. 277/96 |
| 3,975,165 | 8/1976 | Elbert et al. .................. 427/204 |
| 4,376,151 | 3/1983 | Parrotta .................. 428/325 |
| 4,423,097 | 12/1983 | Mons et al. .................. 427/423 |

*Primary Examiner*—Lewis T. Jacobs

[57] ABSTRACT

A gas seal between two relatively moving parts is produced by coating one of the parts with epoxy resin which is then dusted with microspheres having widely varying diameters. The microspheres are concentrated near the surface of the resin and held in place by a wicking action of the resin on the surface of the microspheres. When the two parts are assembled and moved relative to each other, the microspheres near the surface are broken away to a level which provides a close tolerance gas seal between the two moving parts. The broken microspheres create pockets which aid in the sealing process because they provide a change from laminar flow to turbulent flow in the sealing area.

8 Claims, 6 Drawing Figures

FRANGIBLE SEAL COATING AND ITS METHOD OF PRODUCTION

DESCRIPTION

Background of the Invention

This invention relates to fluid seals and, more particularly, to a fluid seal between two relatively moving members.

Motors, compressors, pumps, meters and the like, generally require methods of sealing moving parts to stationary parts to contain or exclude various types of gaseous or liquid fluids. Such seals often require the surfaces of the moving and stationary parts to be in very close proximity for sealing without actually touching as to preclude friction and/or wear. The desire for close proximity of parts surfaces is, however, often impractical due to various considerations such as limitations in machining capability, tolerance, thermal expansion rates of materials, and costs.

Meters are especially difficult to seal because any friction results in an inaccurracy of measurement, since static and dynamic friction is not constant or consistent. In meters such as rotary vane and gate meters, it is desired to have the sealing surfaces in very close proximity to each other without actually chancing contact. Close proximity of surfaces improves performance by making the meter more positive in displacement through reduced bypass of gases or liquids through the seal, while contact is undesirable due to friction work load effects which increase the bypass of gases or liquids through the seals.

It is therefore a primary object of this invention to provide some means whereby the sealing surfaces are in very close proximity to each other without contact.

Since the typical method of obtaining close proximity of surfaces is high precision machining, such as grinding, which is costly, a further object of this invention is the elimination of costly high precision machining.

It is another object of this invention to provide a seal that is easily abraded and collapsible so as to cause reduced residue between the sealing surfaces and further minimize galling, smearing, binding or seizing of any of such surface.

In rotary meters intended for measurement of gaseous fluids (for example, natural gas), there are even more stringent requirements. Such meters are typically constructed of aluminum for a variety of reasons (lightness, corrosion resistance, etc.), and it is typical to hard anodize components in close proximity to avoid galling and seizing should a moving surface contact a stationary surface for some reason. It is therefore a further object of this invention to provide a seal surface which eliminates or precludes the opportunity for surfaces to gall or seize by contact.

Furthermore, in meters intended for measurement of gaseous fluids, it is desirable to have a sealing surface which is consistently rough in texture as this causes the Reynold's Number of the gas in the seal to be very high, which represents turbulent flow (which is desirable) instead of laminar flow. It is therefore yet another object of this invention to create a consistently rough sealing surface.

In a device where very close sealing surfaces between moving and stationary parts are required, and yet contact of these surfaces is not desired, there are opportunities for these surfaces to contact. In a meter, for example, it is possible to have accidental contacts due to foreign material between sealing surfaces, due to changes in gas flow and pressures, due to failures of supporting components, due to deflection of components from unexpected loads (for example, pipe induced stresses), and due to thermal expansion induced collisions. It is therefore still another object of this invention to provide a sealing surface which is easily removable (frangible) should the sealing surfaces accidently contact each other.

It is yet another object of this invention to provide a tough surface under the easily removable surface which is capable of surviving severe contact as to preclude seizing of components.

It is still a further object of this invention to provide a sealing surface which is resistant to chemical attack.

SUMMARY OF INVENTION

The foregoing, and additional, objects are attained in accordance with the principles of this invention by providing a seal coating for a first surface which moves relative to a second surface comprising a mixture of frangible material in a resin binder material wherein the mixture has a material gradient such that it is substantially all resin binder material at the first surface and substantially all frangible material at its boundary away from the first surface.

In accordance with this invention, the seal coating is produced by the method comprising the steps of coating the first surface with a layer of resin binder material and before the resin binder material dries, covering the layer with a frangible material.

In accordance with an aspect of this invention, the resin binder material is epoxy.

In accordance with another aspect of this invention, the frangible material comprises hollow glass microspheres.

BRIEF DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

Briefly described, the preferred embodiment of a seal coating according to this invention consists of hollow glass microspheres embedded in a substrate of epoxy resin. The size-graded microspheres provide an even roughness to the surface of the seal coating which is achieved by the brittle hollow glass microspheres frangibly collapsing into their interiors when they come into contact with another hard surface. The epoxy resin substrate bonds the microspheres to the base surface, providing a tough surface should it be contacted severely, and providing chemical protection for the base surface due to the inherent chemical resistance of the epoxy resin.

Figure 1:
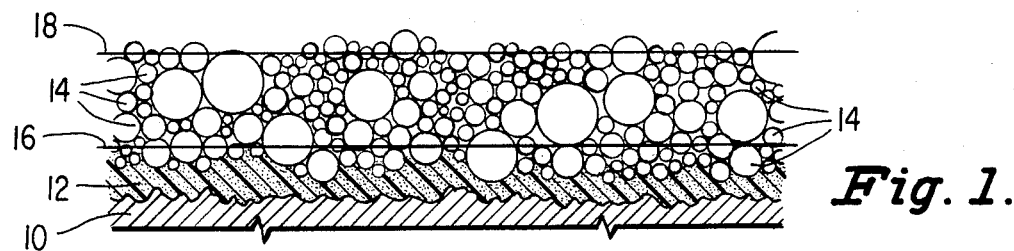
FIG. 1 is a cross-sectional view showing a seal coating applied to a surface in accordance with the principles of this invention.

Referring now to FIG. 1, the base surface 10 can be any material, can be rough, and need not be as precise as the resultant surface. For example, the surface 10 may be just machined and not ground. The substrate 12 of the seal coat is a chemically inactive material appropriate to the application, illustratively an epoxy resin. Covering the substrate 12 are hollow glass microspheres 14. The microspheres 14 are applied to the substrate 12 while the substrate 12 is still wet so that the substrate 12 wicks over the microspheres 14 by surface tension so as to hold the microspheres 14 but not create a substantial impediment to removal if the microspheres are abraded by contact with another surface. The tolerances of the base surface 10, the substrate 12, and the build up of microspheres 14 is designed so that the eventual sealing surface falls somewhere between the levels 16 and 18, creating a continuous seal but not impinging significantly into the substrate 12 as to cause a significant impediment to frangibility.

Figure 2:
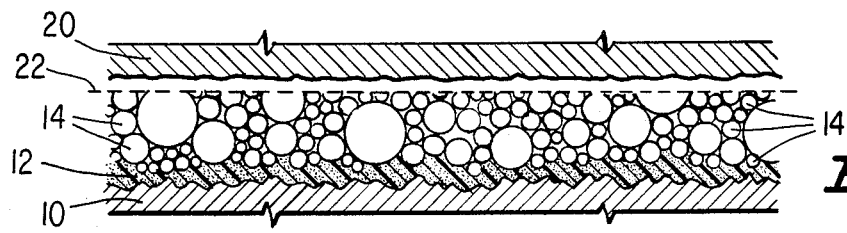
FIG. 2 is a view similar to FIG. 1 showing the seal coating after contacting a second surface which moves relative to the first surface.

FIG. 2 shows the seal coat of FIG. 1 after contacting the mating sealing surface 20. The resultant sealing surface 22 has been abraded away by the collapse or breaking of some of the microspheres 14 between levels 16 and 18 (FIG. 1). The substrate 12 and the wicked surfaces of the microspheres 14 are substantially intact, creating very little impediment to removal of some of the microspheres 14 at the level 22. The designed distance between the surfaces 10 and 20 can be relatively large, as compared to the distance between the sealing surface 22 and the surface 20, and the tolerances relatively imprecise.

Figure 3:
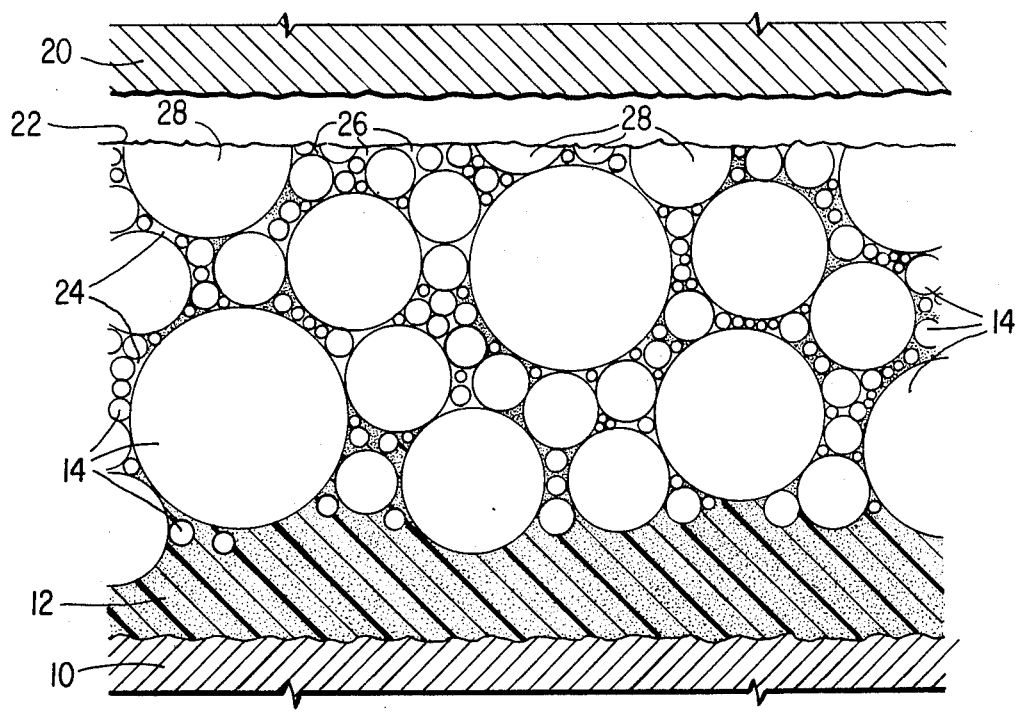
FIG. 3 is a view similar to FIG. 2 but at an enlarged scale.

FIG. 3 is a representation of a photomicrograph of the structure shown in FIG. 2. It is seen that there is a continuous substrate layer 12 adhered to the base surface 10. This layer 12 provides chemical protection and antigalling protection and is seen to just coat the hollow microspheres 14 so as to leave voids 24 in addition to the void within the microspheres. This is useful in that the resistance to removal of the microspheres is made easier and provides additional desired pockets 26 at the abraded surface 22. Further, the microspheres 14 are not entirely shattered or removed when abraded with the other sealing surface 20, but only have that portion of the microsphere broken away as to form a precise surface 22, resulting in the desired pockets 28.

The preferred embodiment shown in FIG. 3 was derived at after considerable experimentation and microscopic examination of resultant surfaces utilizing various substrate materials and sizes of microspheres. It was found that simply coating the surface with epoxy resin and "dusting" the surface with microspheres having widely varying diameters was preferable to other configurations in providing the desired frangibility. Premixed substrate and microspheres resulted in elimination of the substrate pockets 24 and 26 and made the surface 22 much more difficult to abrade by the opposite surface 20. It was found that epoxy resin was highly suitable when making a seal coat for a rotary meter, but just about any other type of substrate could be used, resulting in various characteristics. For example, various type resins could offer adequate surface protection but were "gummy" in removal, even when throughly heat cured. Polyester materials were found adequate, but offered no advantages over epoxy. It was also found that a wide range of microspheres diameters was preferable to a narrow range in that the smaller microspheres tend to help substrate wicking and the larger microspheres tend to improve the frangibility characteristic.

Figure 4:
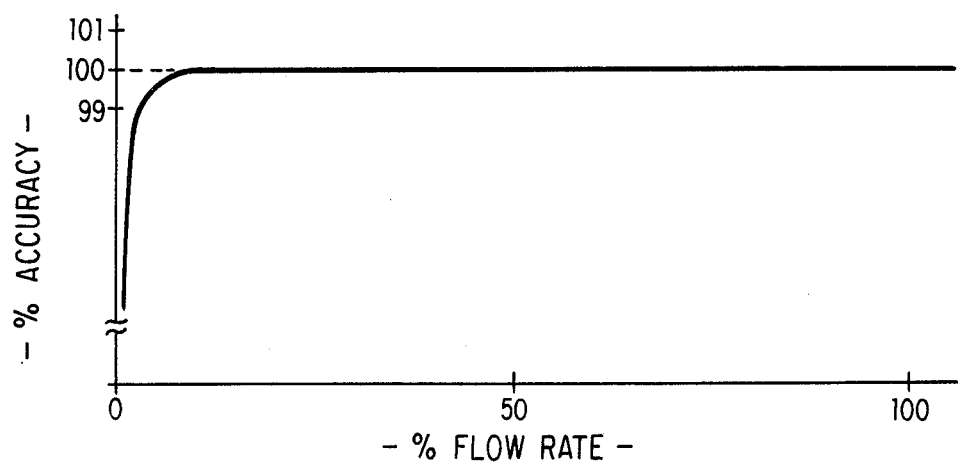
FIGS. 4, 5 and 6 are gas meter accuracy curves useful in understanding the advantages of the present invention.
Figure 5:
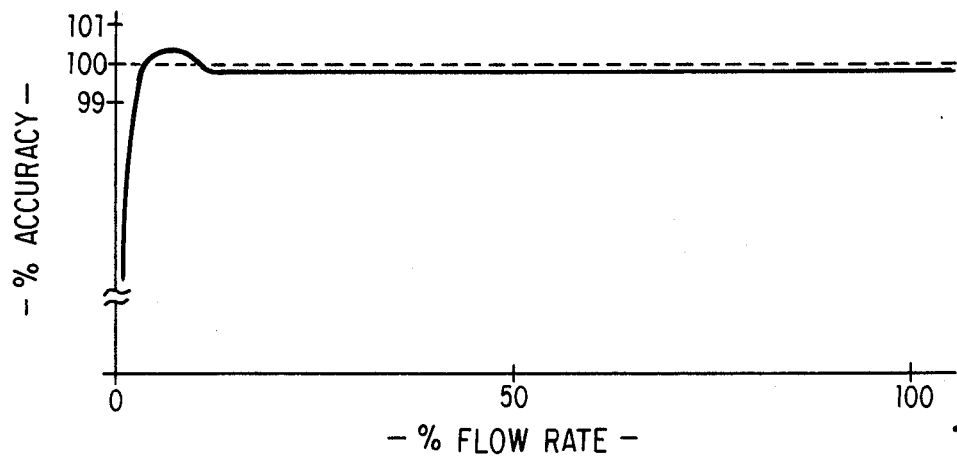
Figure 6:
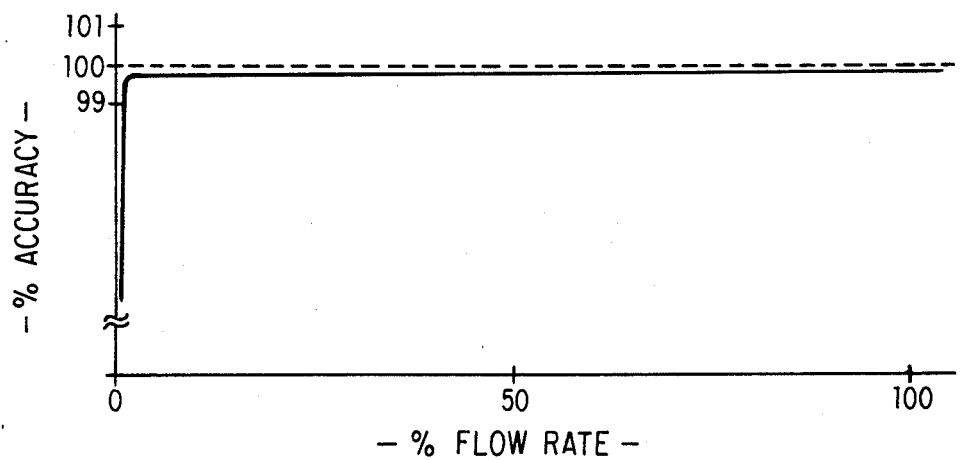

The pockets 26 and 28 were anticipated and serve a useful purpose in rotary gas meters. A characteristic of rotary gas meters is that they are affected by the change from laminar flow to turbulent flow depicted by higher Reynold's Number in the sealing area—a perfectly smooth sealing surface is not desired. FIG. 4 is an accuracy curve of a rotary vane and gate meter when tested at "bell pressure" (0.25 psi). FIG. 5 shows the accuracy curve of the same meter when tested at an elevated pressure (above 50 psi). Without the seal coating as hereinabove described, this meter is seen to have a characteristic "boost" at low flow rates due to laminar flow at the sealing surfaces and a "droop" at higher flow rates due to turbulent flow at the sealing surfaces. The transition from laminar flow to turbulent flow depends on the pressure and thus the Reynold's Number, which is roughly 1500 to 2000. FIG. 6 shows an accuracy curve of the same meter when tested at the same pressure as in FIG. 5 but wherein the meter has the seal coating described above. This meter would have the same "bell curve" as in FIG. 4 but at elevated pressure, it is seen that the accuracy is flat but depressed with no discernible "boost". This is an anticipated and highly desired gas meter characteristic as the lowered but flat accuracy can be compensated for by a variety of methods. This is due to the increased Reynold's Number due to the frangible seal coating. The reason for this higher Reynold's Number is the characteristic of the surface of the coating as shown in FIG. 3. The pockets 26 between the microspheres and the pockets 28 in the broken microspheres provide considerable turbulence in the sealing area and this increases the Reynold's Number.

In accordance with this invention, the above described seal coating is produced in the following manner, illustratively, for a rotary vane and gate gas meter. The parts are typically made of aluminum, and the aluminum running surfaces (critical surfaces) that require a tight seal clearance are machined to provide a metal to metal clearance on the order of 5 to 7 thousandths of an inch. The initial clearance may be slightly less or up to several times more. The lower limit is set by the coating becoming too resin rich and dense to readily abrade. The upper limit is controlled by the ability of the liquid epoxy to adequately wick and bond into the applied microspheres. Wetout of the beads is limited by epoxy film thickness, which in turn is limited by resin viscosity (which must remain thin without running). Also, too thick a coating can be self-defeating as to process control and function.

The aluminum surfaces should be given a chromate conversion coating to improve the corrosion resistance of the aluminum and to enhance adhesion of the primer film, but this is not absolutely mandatory. The seal coating could also be applied to other metals or plastics. In any event, the surfaces should be clean and dry. Next, the surfaces should be fixtured and appropriately masked so as to keep the subsequent coating materials away from all surfaces where such coating cannot be tolerated.

The critical surfaces which are to be coated are first spray coated with a two part epoxy material. The epoxy is applied evenly to a wet film thickness in the range of 1 to 1.5 thousandths of an inch thick. The wet film is approximately 50% solids when applied. The epoxy is preferably a pigmented material which helps to visualize film build. A preferred epoxy is Mobil Series 79 epoxy primer. It is thickened with a 50:50 mixture of xylene and MIBK solvents. A Binks Model 69 spray gun with a 66SK nozzle may be used. No coating runs are permitted. Complex intersecting areas on the same part that require coating may have to be done in two steps. This would be required to insure that the proper film build is obtained on each surface. Any subsequent to be treated areas would have to be masked to prevent over-spray since film dry-out is not permissible. It is noted that the material used to bond the microspheres to the substrate can be other than an epoxy primer paint. It may be of any other resin system that offers the necessary bonding strength and chemical resistance (for example, polyurethane, polyester, polyacrylic, etc.). The bonding material may be thinned as necessary with any compatible solvents which can be further selected with evaporation rates that insure the applied bonding film stays wet during the period of microsphere application. If thicker film build is desired, then a thixotropic agent should be added to the bonding material. This will allow a higher build up thickness of microspheres, which may be of benefit in some applications.

The next step should be done immediately after the spray coating is applied and before any obvious drying of the paint film. The epoxy film must be fresh and wet. If such becomes a problem, a slower evaporating solvent should be used (i.e., MIAK), not necessarily more solvent. To the wet epoxy primed surface, hollow glass microspheres are applied. A preferable material is No. 120 Q Cell hollow microspheres, a product of PQ Corporation. The particle size range is from 5 to 75 microns. The dry microspheres are applied directly to the wet film. They are applied via a dusting technique in which the particles fall upon the wet film perpendicularly, with a minimum of angularity, to avoid paint film wiping and removal. A flour type sieve or fine screen frame is a simple applicator. The microspheres are evenly applied across the wet surface until a buildup of excess dry material occurs up to about 1/16 inch. No signs of wet resin glaze should be visible in the coating. The hollow microspheres that are used have a distribution range of sizes (approximately 90% in the 5 to 75 micron diameter range). This distribution range is beneficial in that it provides both the larger size particles necessary to achieve the overall buildup thickness of the coating, while the smaller particles promote wicking of the bonding agent and filling of the voids between the larger microspheres. In addition, the smaller microspheres settle toward the substrate and thereby create a gradient of particle size distribution in the total coating, with the larger particles being enriched at the outer top level. Since the microspheres are hollow and larger at the surface, easier abrasion of them is possible when the parts are trimmed and worn-in. In service, further wear is increasingly inhibited due to the additional abrasion of encountering smaller microspheres (with lower void-to-volume ratio which causes greater hardness), and an increase in bonding resin content (which adds to wear resistance). While the 5 to 75 micron microsphere diameter range is optional in this particular application, proportional ranges in larger sizes may be used in other applications where higher coating builds are desired (large diameter parts). While the preferred microspheres are of a sodium borosilicate composition, other compositions may be used where greater or lesser hardness is desired (i.e., silicon or plastic, respectively).

The use of hollow microspheres is necessary for several reasons. The relative specific gravity of the smaller microspheres is greater than that of the larger microspheres and this causes the distribution gradient of sizes in the bonding material that occurs in the wet, liquid state. On drying out, this particle size gradient is made permanent in the seal coating. This provides the increased abrasion resistance desired as one approaches the base substrate. During trimming, and particularly wear-in, the hollows of the microspheres give the excess material a place to be deposited without such residues progressively building up and wedging tight between the very close running clearance. This would otherwise result in jamming of the mechanism. Finally, the exposed hollows of the microspheres on the surface promote turbulence in the flowing gas stream as it attempts to leak through the seal surface. Such turbulence inhibits and slows the passage of gas through such tight seal areas.

During this step, excess microspheres are left in place for five to ten minutes to allow wicking of the epoxy paint film into and up through the microspheres. This time also allows for some solvent evaporation and strengthening of the epoxy bond to the spheres. The excess spheres are gently tapped and shaken from off these parts (and may be reused). The parts are then placed in a preheated oven at 150° F. to 160° F. and allowed to cure for one hour. This is to complete epoxy cross-linking for maximum bonding strength and chemical resistance. Of course, each bonding agent has its own set of curing conditions, and such should be applied to obtain the optimum properties for each.

The cooled parts are then brushed of loose spheres with a fine brush or air blast. The nominal thickness of the coating is about 6 to 8 thousandths of an inch. The parts can substantially be "trimmed" to size by placement in a trim fixture in which the part can be positioned to rotate against a hardened trim blade where excess high spots can be readily removed. The purpose is to remove high spots and excess that may occur on the coated surfaces. If a trim fixture is used, the trim fixture must be customized for each part and may be manually or motor operated. On softer seal coatings, a hardened steel blade may be used—on harder material, diamond tooling or abrasive wheels may be required. The completed parts are then air cleaned of any residual material and grit. Assembly of the parts consists of mechanically turning them through their running position as each is installed, followed by operating the meter on air to wear in the coating and expel excess coating material. The use of a thermal gradient (i.e., cooling outer housing or heating inlet gas) may be employed to achieve additional clearance between running parts.

The aforedescribed seal coating, and its method of production, meet all of the objectives previously set forth. Thus, the sealing surfaces are in very close proximity to each other without the costly technique of high precision machining. For example, the frangible coating can result in a 0.0005 inch seal clearance but allow a nominal "base" distance between part surfaces of 0.005 inch to 0.007 inch, thus allowing the parts to be used directly from machining centers without additional processing (at a considerable reduction in cost). Perhaps even more useful is the fact that the coating allows considerable latitude in eccentricity, taper, wobble, dishing and surface finish of mating sealing surfaces. The frangible coating allows the parts to assume their natural dynamic state and the coating is abraded away accordingly.

Further, the actual sealing clearance can be tailored as required. The method used in practice is to use thermal expansion rates of the sealing components to create the desired clearance. For instance, a rotor can be heated in place to cause its expansion to abrade away a very specific amount of its frangible coating, or the housing can be cooled preferentially to cause it to shrink as to abrade away a very specific amount of the frangible coating on the rotor. Specifically, the construction of each device dictates the sealing surface to be coated and that the distance between sealing surfaces can be precisely obtained by using the thermal expansion of various components.

In actual application to a given mechanism, the thickness of the frangible coating can be tailored to the requirements of the design. Similarly, the clearance between sealing surfaces can be tailored to the application—preferential thermal treating is but one method. It has been found that it is desirable, but not absolutely necessary, to coat one or the other sealing surface; it is generally easier to coat one surface, and it is less costly to coat only one surface.

As an objective, the hollow glass microspheres provide a frangible coating which collapses into less volume than the untouched volume. The thin walls of the glass microspheres contain considerably less volume than the inside diameter of the microspheres so that the wall residue, when abraded, is easily contained within the remaining parts of the microsphere, or other abraded microspheres nearby. There is little or no evidence of excessive residue causing seizing, galling, smearing or binding between the resultant sealing surfaces.

It has been determined that the frangible coating method is superior to hard anodizing to eliminate metal-to-metal contact so as to preclude potential galling. In simulations of hard contact, hard anodized sealing surfaces are broken and galling occurs, especially with aluminum components. When one of the components is coated with a frangible coating, especially when the substrate is very hard epoxy, hard contact does not seem to have any effect at all with almost complete survival of components (barring catastrophic failure of the mechanism). In such hard contact events, the microspheres are crushed and the hollow microspheres appear to act as a collapsing cushion. The substrate is sufficiently thick and hard enough to prevent breakthrough to the base metal. The very fact that the frangible coating has considerable thickness compared to hard anodizing, undoubtedly contributes to this superior performance, as considerably more part deflection must occur before base metal contact of the sealing surfaces is established. It should be mentioned that fluorocarbon substrates, which form "gummy" material as a frangible surface, is a superior anti-galling substrate comparable to epoxy—fluorocarbon might even be considered superior in some types of machines.

The objective of providing an evenly rough surface to increase the Reynold's Number is obtained by the frangible coating. Gas meter performance, as shown in FIGS. 4, 5 and 6, is significantly enhanced by this method of coating. To this end, a biased size range of microsphere diameters seems to be superior to a narrower size range of microsphere diameters. The performance curve of FIG. 6 is an unusual and highly desirable characteristic of a rotary vane meter at high pressure, whereas the accuracy curve of FIG. 5 is typical. With the performance shown in FIG. 6, it is possible to offset the "droop" with a pressure correction span adjustment, so that the higher pressure is overcorrected as to simulate 100% accuracy. With the curve shown in FIG. 5, such correction may correct the higher flow rates but also overcorrects at the lower flow rates. Thus, the frangible coating provides valuable characteristics in rotary vane and gate gas meters.

The frangible coating has also been found to be superior with respect to providing protection against accidents of foreign objects between sealing surfaces, changes in gas pressures and flow, failure of supporting components, deflection due to pressure or externally applied loads (such as pipe stress) and thermal expansion deflections. Large pieces of foreign material are able to be absorbed by the frangible coating. Deflection of components, for any reason, only causes the sealing surfaces to contact, but unlike metal-to-metal contact the offending frangible coating is just abraded away without catastrophic failure. Indeed, the potential for stress induced deflection is a typical reason for larger designed sealing clearances, but this frangible coating does not require this compromise, allowing much closer sealing clearances to be practical and generally providing a great advantage in performance.

The frangible coating is also superior with respect to resisting chemical attack. This chemical resistance is controlled by the resin binder. Almost any material can be selected as the substrate but epoxy is generally excellent. Frequently, it is contact and subsequent removal of any protection coating by abrasion that causes chemical protection to fail. The frangible coating hereindescribed is relatively thick and continuous so that contact is much more difficult and the amount of coating protection substantially increased. Generally, the chemical resistance of the imbedded microspheres is also excellent.

Accordingly, there has been disclosed an improved frangible seal coating and its method of production. It is understood that the above-described embodiment is merely illustrative of the application of the principles of this invention. Numerous other embodiments may be devised by those skilled in the art without departing from the spirit and scope of this invention, as defined by the appended claims.

We claim:

1. A method of producing a fluid seal on at least one surface of a pair of members capable of relative movement, comprising the steps of:
   coating said one surface with a layer of resin binder material; and
   before said resin binder material dries, covering said layer with hollow glass microspheres.

2. The method according to claim 1 wherein said resin binder material is epoxy.

3. The method according to claim 1 wherein said hollow glass microspheres have their diameters substantially within the range from about 5 microns to about 75 microns.

4. The method according to claim 1 wherein the step of covering includes the step of applying the microspheres to the wet layer substantially perpendicular thereto.

5. The method according to claim 1 further including the step of heating the coated and covered surface.

6. The method according to claim 1 wherein said one surface is formed of aluminum and further comprising the step of giving said one surface a chromate conversion coating prior to the step of coating.

7. A seal coating on a first surface which moves relative to a second surface comprising a mixture of hollow glass microspheres in epoxy resin wherein the mixture has a material gradient such that it is substantially all epoxy resin at said first surface and substantially all hollow glass microspheres at its boundary away from said first surface.

8. The seal coating according to claim 7 wherein said hollow glass microspheres have their diameters substantially within the range from about 5 microns to about 75 microns.

* * * * *